Dec. 18, 1928.
B. McCANDLESS
ROLL HOLDING CAMERA
Filed Jan. 4, 1927
1,695,382
4 Sheets-Sheet 1
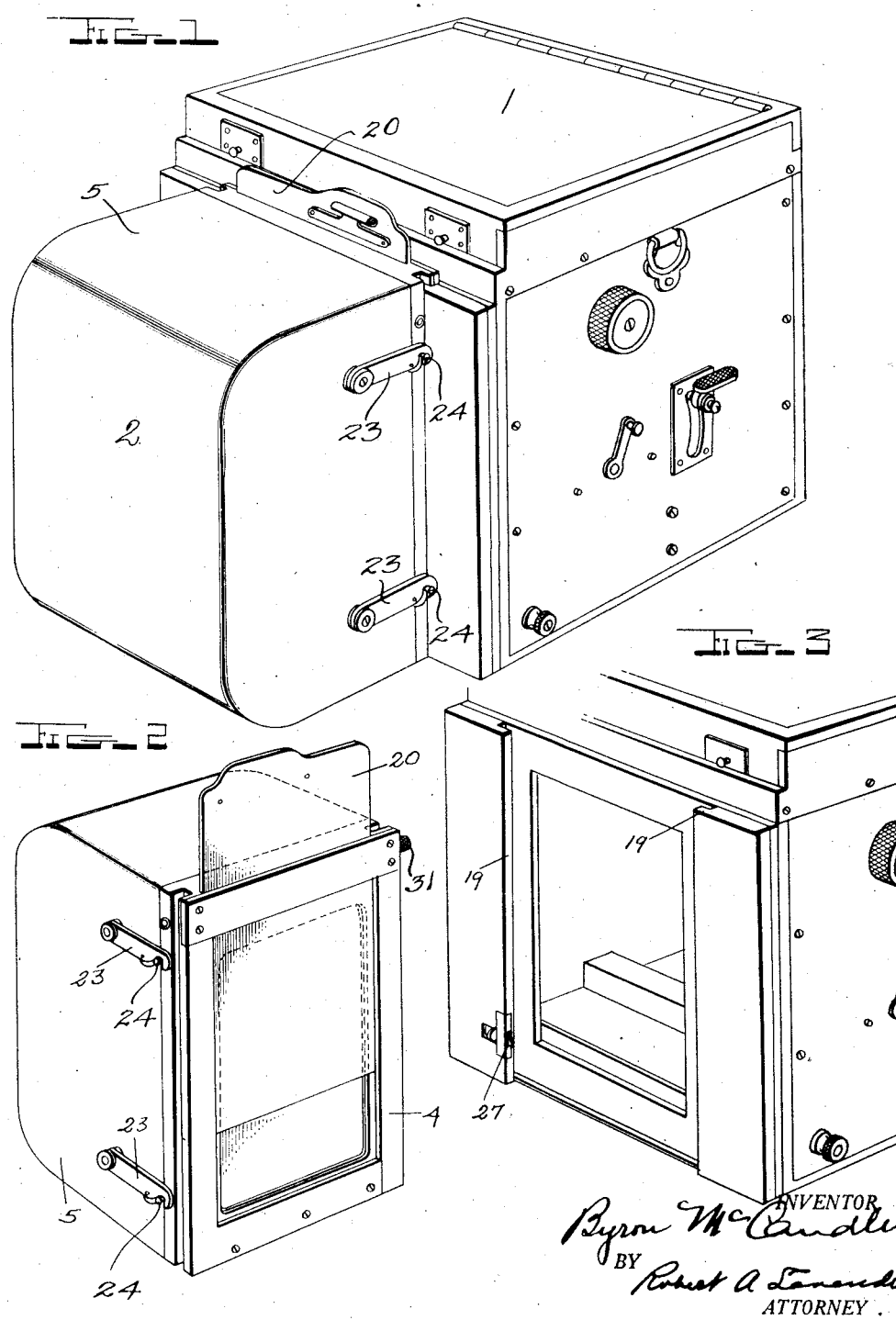

Dec. 18, 1928.  B. McCANDLESS  1,695,382
ROLL HOLDING CAMERA
Filed Jan. 4, 1927   4 Sheets-Sheet 2
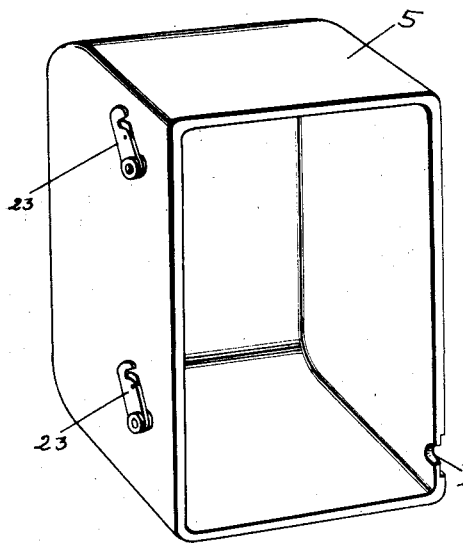
FIG_4
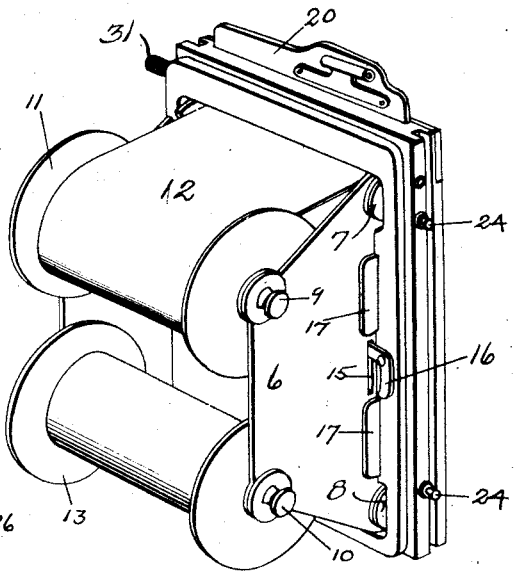
FIG_5
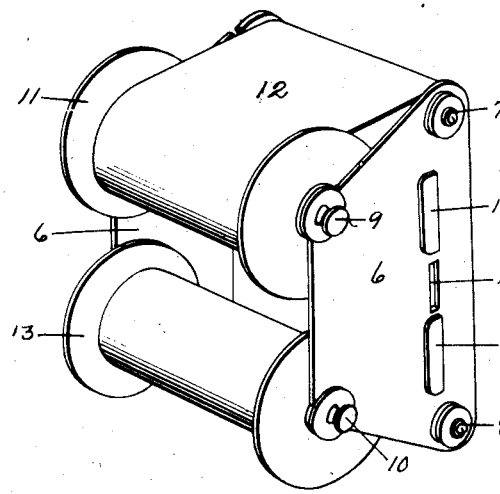
FIG_6
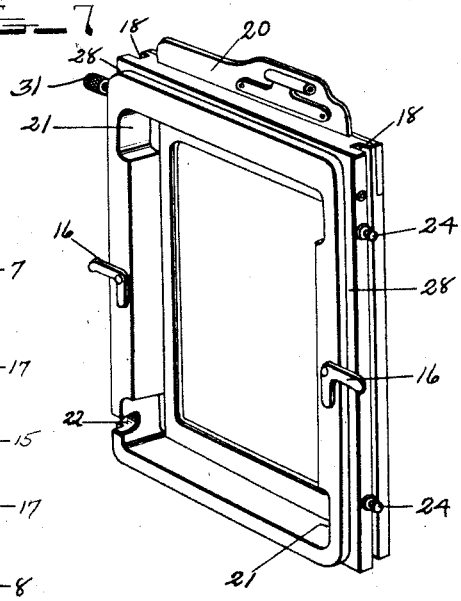
FIG_7
INVENTOR.
Byron McCandless
BY Robert A. Lander
ATTORNEY.

Dec. 18, 1928.
B. McCANDLESS
1,695,382
ROLL HOLDING CAMERA
Filed Jan. 4, 1927    4 Sheets-Sheet 3
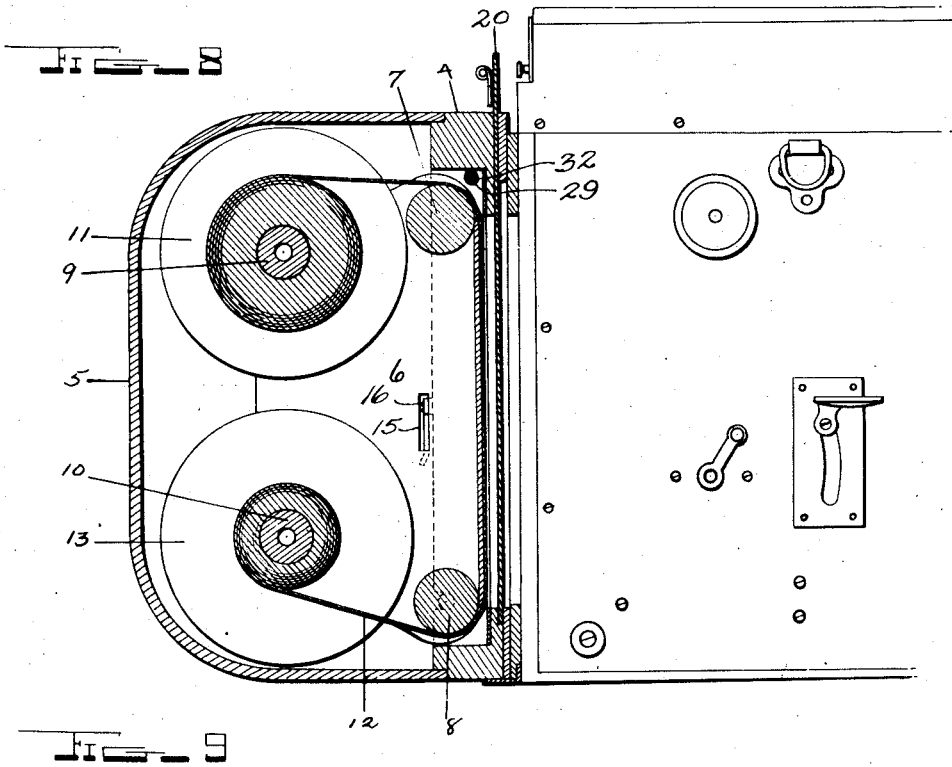
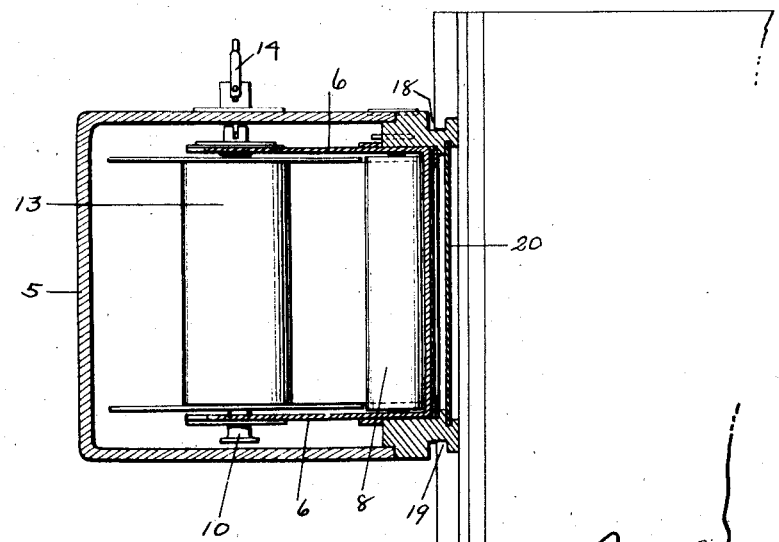
INVENTOR.
Byron McCandless
Robert A. ...
ATTORNEY.

Dec. 18, 1928.
B. McCANDLESS
1,695,382
ROLL HOLDING CAMERA
Filed Jan. 4, 1927  4 Sheets-Sheet 4
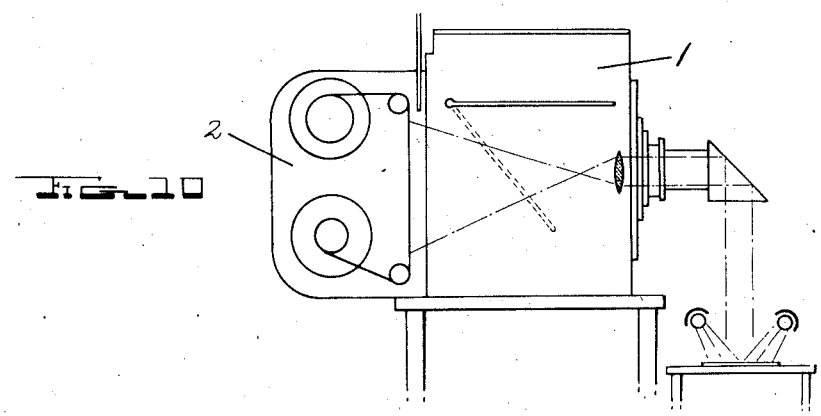
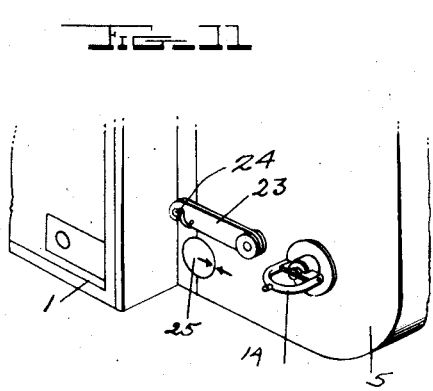
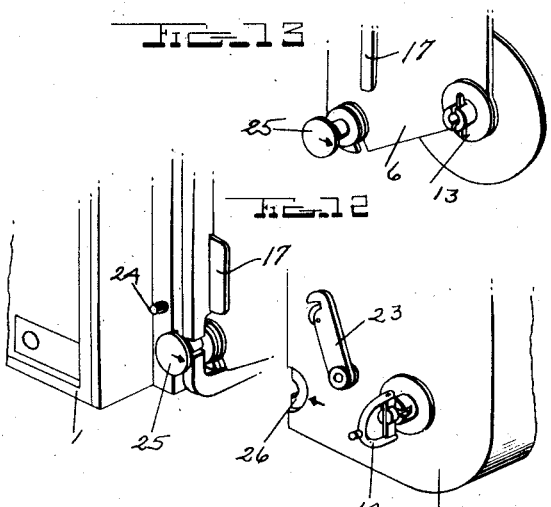
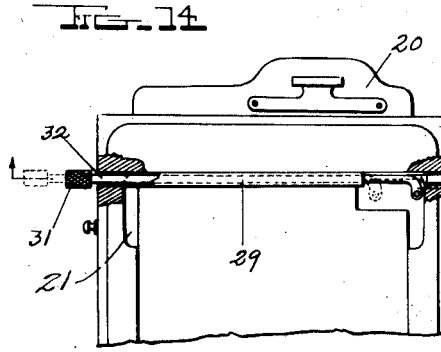
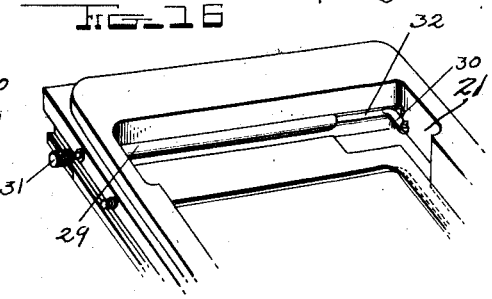
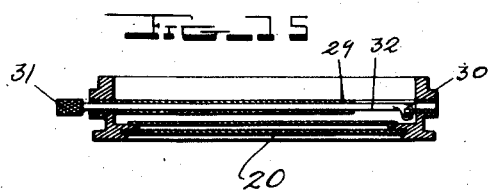
INVENTOR.
Byron McCandless
BY Robert A. Lavender
ATTORNEY Patented Dec. 18, 1928.

1,695,382

UNITED STATES PATENT OFFICE.

BYRON McCANDLESS, OF ANNAPOLIS, MARYLAND.

ROLL-HOLDING CAMERA.

Application filed January 4, 1927. Serial No. 158,973.

My invention relates broadly to roll holding cameras and more particularly to a holder for a roll of sensitized paper for use therein.

The principal object of my invention is to provide a portable roll holding camera having a paper roll holder that is quickly and easily removed or attached to the camera.

Another object of my invention is to provide a paper roll holder that may be easily disassembled and assembled for the replacement of the sensitized paper.

With the above and other objects in view, the invention consists in the construction, combination and arrangement of parts as will be hereinafter more fully described.

Reference is to be had to the accompanying drawings forming a part of this specification in which like reference characters indicate corresponding parts throughout the several views and in which:

Figure 1 is a rear perspective view of a portable roll holding camera embodying my invention, Figure 2 is a front perspective view of the paper roll holder detached from the camera, Figure 3 is a view showing means for retaining the paper roll holder on the camera, Figure 4 is a view of the cover forming a part of the paper roll holder, Figure 5 is a view of the paper roll holder with the cover removed, Figure 6 is a view of the paper roll carrier, Figure 7 is a view of the paper roll carrier support, Figure 8 is a side view partly in section showing my invention, Figure 9 is a top view partly in section, Figure 10 is a diagrammatic view of my roll holding camera, Figure 11 is a detail showing the paper roll holder attached to the camera, Figure 12 is a similar view showing the holder detached, Figure 13 is a corner detail of the paper roll carrier, Figure 14 is a view partly in section illustrating a marker used with my invention, Figure 15 is a section on the line 15—15 of Figure 14, and Figure 16 is a perspective view of Figure 14.

Referring more particularly to the drawings, 1 indicates a roll holding camera and 2 a sensitized paper roll holder attached thereto as will be hereinafter more fully described. The paper roll holder comprises paper roll carrier 3, paper roll carrier support 4 and cover 5.

The paper roll carrier 3, shown more particularly in Figure 6, comprises two plates 6 held in spaced relation by two parallel rollers 7 and 8 extending through the plates at the forward upper and lower corners. The rear corners of the plates are provided with locking pins 9 and 10 for holding the wind-off spool 11 and wind-on spool 13 respectively. By manipulation of the key 14 that engages with one of the pins 10, the roll of sensitized paper 12 is moved from the spool 11 to the spool 13, it being guided in its passage by the rollers 7 and 8. By this arrangement the sensitized paper is held taut over an area sufficiently large to receive the exposure desired. Each of the plates is provided with an elongated opening 15 to receive a latch 16 pivotally carried by the paper roll carrier support 4 whereby the carrier and support are held together securely. Stop members 17, see Figures 5 and 6, are mounted on the exterior of the plates to limit the distance of insertion of the carrier into the holder assuring proper alignment of the securing means.

The roll carrier support, shown in Figure 7, is a rectangular member, the sides of which are provided with longitudinal grooves or channels 18 to receive extensions 19 on the rear of the camera, forming a tongue and groove connection between the support and camera effectively prohibiting the entrance of light rays therebetween when the two are in assembled position. Also, this type of connection permits easy separation of the support from the camera when it is desired to gain access to the interior of the paper roll holder. Accidental movement of the support when attached to the camera is prevented by a catch 27 carried by the camera engaging in a member suitably provided on the support. When the support is removed from the camera, the sensitized paper is protected from light rays by a slide 20 operable in suitable guideways in the support. Portions 21 of the inner surface of the frame are cut away to receive the bearings of rollers 7 and 8 to permit a snug fit of the carrier in the support. Provision is made at 22 to allow the shaft of a revolution indicator 25 to pass through the frame.

A cover 5, see Figure 4, is provided to protect the roll of sensitized paper from light and moisture. This cover is of such shape and size that it will fit over the paper roll carrier and its edges rest flush against the portions 28 of the frame, as may be more clearly seen in Figures 8 and 9. Hooks 23 carried by the cover engage with pins 24 on the frame to secure the cover in place.

The revolution indicator that extends through the frame rests in a recess 26, formed in the cover, see Figures 11 and 12, so as to be flush therewith and coacts with a suitable mark on the cover to indicate the amount of paper wound from one spool onto the other. The winding key 14 is carried by the cover, and as above stated, engages with the wind-on spool 13 to move the sensitized paper.

As a marker to indicate the limit of the reproduction of the work reproduced, I use a rod 32 extending transversely of the frame adjacent to its upper end, and operable in a tubular guideway 29. This rod is provided with an angular portion 30 which is so constructed that as it is drawn to the left by the knob 31 as represented in Figure 14 of the drawings, it causes a line to be marked on the paper. The operator can thus ascertain where the unused portion of the paper begins.

From the above description it will be apparent that I have provided a roll holding camera in which the paper roll holder may be easily and quickly assembled or disassembled making it possible to replenish the roll of sensitized paper in the most expeditious manner. Also when in its disassembled condition, the camera may be carried about by the operator in a compact package, and when the camera is used in conjunction with the table described in my co-pending application Serial No. 158,974 filed January 4, 1927, it provides a means of making copies with great ease.

With the above and other objects in view it will be understood that the above description and accompanying drawings comprehend only the general and preferred embodiment of my invention and that minor detail changes in construction and arrangement of parts may be made within the scope of the appended claims and without sacrificing any of the advantages of my invention.

What I claim is:

1. A roll holding camera comprising a body portion, a casing detachably mounted adjacent to one side of the body portion, an intermediate frame member positioned between the body portion and casing, a sensitized paper roll holder removably mounted within the frame and covered by the casing, and means carried by the frame for indicating the extent of adjacent exposures on the sensitized paper.

2. A portable roll holding camera including a body portion, a casing detachably mounted adjacent to one side of the body portion, an intermediate frame member positioned between the body portion and casing, a sensitized paper roll holder detachably mounted within the frame member and covered by the casing, said holder being provided with elongated apertures in the sides thereof, and pivoted means carried by the frame member for engagement in the apertures to secure the holder against accidental displacement from the frame.

3. A roll holding camera including a body portion, a casing detachably mounted adjacent to one side of the body portion, an intermediate frame provided with a passageway therethrough adjacent to one corner thereof, positioned between the body portion and the frame, a sensitized paper roll holder detachably mounted within the frame and covered by the casing, and spool holding devices supported by the holder, one of which is provided with a revolution indicator extending through the passageway.

BYRON McCANDLESS.